H. S. PIERCE.
DRIVE CHAIN.
APPLICATION FILED NOV. 7, 1919.
1,431,035.
Patented Oct. 3, 1922.
2 SHEETS—SHEET 1.
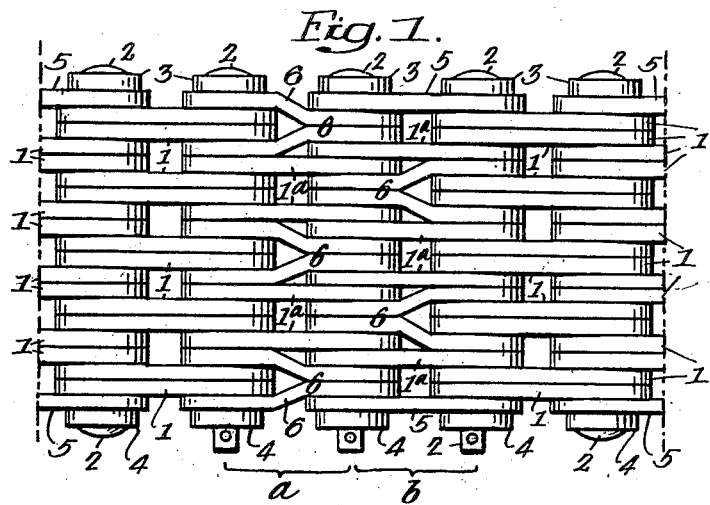
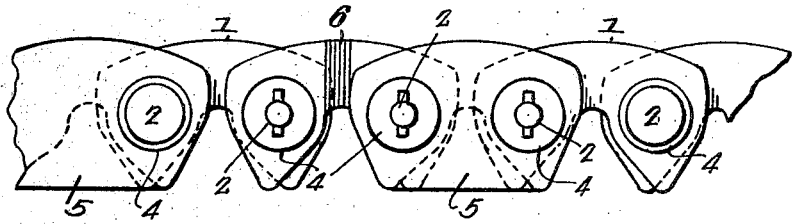
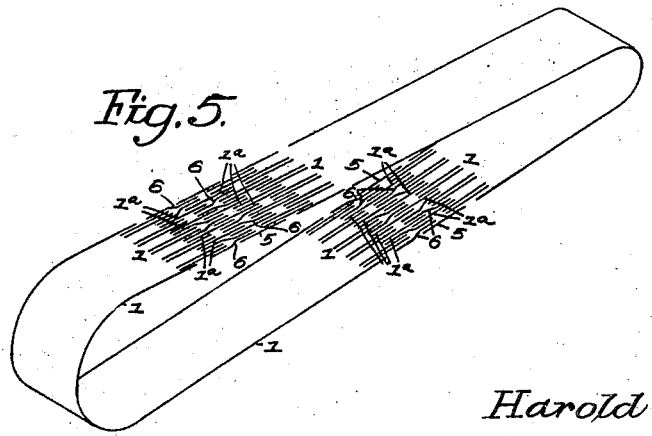
Inventor—
Harold S. Pierce.
by his Attorneys.

H. S. PIERCE.
DRIVE CHAIN.
APPLICATION FILED NOV. 7, 1919.

1,431,035.

Patented Oct. 3, 1922.
2 SHEETS—SHEET 2.

Inventor—
Harold S. Pierce.
by his Attorneys
Howson & Howson

Patented Oct. 3, 1922.

1,431,035

UNITED STATES PATENT OFFICE.

HAROLD S. PIERCE, OF INDIANAPOLIS, INDIANA, ASSIGNOR TO LINK-BELT COMPANY, OF CHICAGO, ILLINOIS, A CORPORATION OF ILLINOIS.

DRIVE CHAIN.

Application filed November 7, 1919. Serial No. 336,524.

*To all whom it may concern:*

Be it known that I, HAROLD S. PIERCE, a citizen of the United States, and a resident of Indianapolis, county of Marion, State of Indiana, have invented certain Improvements in Drive Chains, of which the following is a specification.

My invention relates to certain improvements in drive chains in which the links are of a given pitch and in which the ends of the chain must be connected so that the chain can be used as a drive chain in passing around sprocket wheels. In some instances, the chains are of the proper pitch length so that they can be coupled without the use of offset links, but, in some cases, owing to the distance between the centers of the shafts on which the sprocket wheels are mounted, it is necessary to provide chains of a length equivalent to an odd number of total pitches. Offset links are used to connect the ends of the chain. The objection to offset links is that they are not so strong as the straight links and are liable to be elongated, owing to the offset.

One object of the invention is to strengthen the chains in which the offset links are necessary.

A further object of the invention is to design the chain so that straight links can be combined with the offset links at the joint.

In the accompanying drawings:

Fig. 1 is a plan view of sufficient length of a drive chain to illustrate my invention;

Fig. 2 is a side view of the chain illustrated in Fig. 1;

Fig. 5 is a view, in diagram, of a chain with two sections of straight and offset links.

Figure 3:
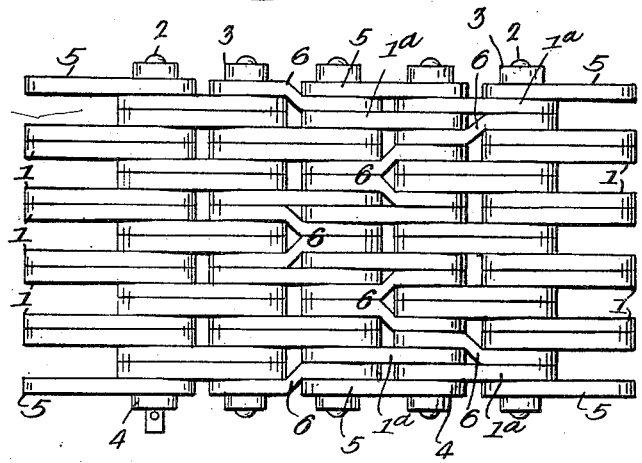
Figs. 3 and 4 are views illustrating modifications of the invention.

In the drawings, I have illustrated a type of chain in which the links are provided with teeth, which mesh with the teeth of a sprocket wheel. It will be understood that the type of chain may be modified without departing from the essential features of the invention.

1 is a series of straight links coupled together by pivot pins 2 which extend entirely through the links and through washers 3 and 4 at each end. The pivot pins on the ordinary type of chains are riveted over the washers so that the body of the chain is a permanent structure.

In Fig. 1, I have illustrated the links 1 arranged in pairs, one pair of one series alternating with those of the other series, the outside links of alternate pairs being single links. In the present instance, the links 5 are extended so as to form guide links to hold the chain laterally on the sprocket wheels. The means for holding the links in position may be modified without departing from the spirit of the invention.

6 are the offset links. These offset links are usually arranged in a series across the chain and constitute the sole connection between the two ends of the chain and if excessive strains be placed upon the chains the offset links will straighten out and destroy the pitch. By my invention, I use both offset links 6 and plain links 1ª at the joint, as in Fig. 1, thus materially strengthening the joint, as the straight links 1ª resist the tension and prevent the straightening of the offset portions of the offset links.

By arranging one set of offset links on two pins, as shown at *a*, and the remainder, as at *b*, the same number of offset links is used as heretofore, with an equal number of straight links. It will be seen that a coupling can be made where offset links are necessary in such a manner that the offset links can be combined with straight links so as to materially strengthen the joint and overcome the objection to the offset link construction.

In Fig. 1, I have illustrated a chain of a given length having three sets of offset links on one section *a* and two sets of offset links on a section *b*.

In Fig. 3, I have illustrated a chain in which the arrangement of the offset links is extended in the same width of the chain as in Fig. 1, so that in one series there are four offset links and six straight links and in the next series four offset links and six straight links, while in the next series there are two offset links and eight straight links.

Figure 4:
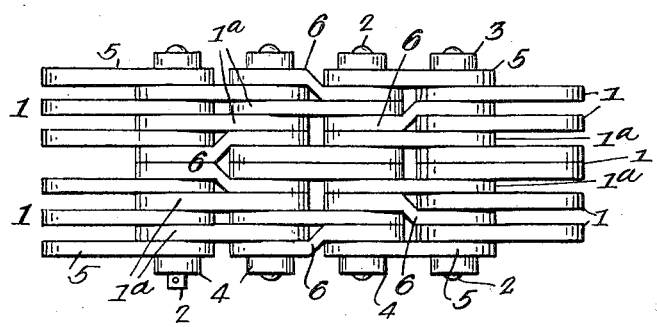

In Fig. 4, I have illustrated a narrow chain, in which the links are extended so as to form three series of two offset and four straight links.

In making up a drive chain of the above type, two or more sections, having the combined straight and offset links, are located in the chain, as shown in the diagram view, Fig. 5, so that, as the chain wears, it may be shortened by a single pitch on removing the offset links and a single pivot pin of one of the sections.

It will be seen from the above construction that I strengthen a drive chain of this type and prevent the offset links from lengthening in service and also prevent the chain from losing pitch.

I claim:

1. The combination in a drive chain, of a series of straight links; pivot pins connecting the links; and a combination of alternating sets of offset and straight links in the same pitch connecting the ends of the chain.

2. The combination in a drive chain, of a series of straight links; pivoted pins connecting the links; and a combination of one or more offset links alternating with one or more straight links in the same pitch, connecting the ends of the chain.

3. The combination in a drive chain, of a series of straight links; pivot pins connecting the links; and two series of offset links alternating with straight links connecting the two ends of the chain, the straight links preventing the straightening of the offset links and also preventing the chain from losing pitch.

4. The combination in a drive chain, of a series of chain links; and a connection when an odd number of pitches is necessary, said connection consisting of a series of offset links and a like number of straight links with which the offset links alternate.

5. The combination in a drive chain of the silent type, consisting of a series of links having teeth arranged to engage the teeth of a sprocket wheel; and two series of toothed offset links and two series of toothed straight links with which the offset links alternate and forming a connection between the two ends of the chain.

HAROLD S. PIERCE.